(No Model.)

L. STERNE.
SPRING.

No. 316,306. Patented Apr. 21, 1885.

Witnesses:
Henry Bossert
Harry Drury

Inventor:
Louis Sterne
by his Attorneys

N. PETERS, Photo-Lithographer, Washington, D. C.

UNITED STATES PATENT OFFICE.

LOUIS STERNE, OF LONDON, COUNTY OF MIDDLESEX, ENGLAND.

SPRING.

SPECIFICATION forming part of Letters Patent No. 316,306, dated April 21, 1885.

Application filed February 9, 1885. (No model.) Patented in England August 15, 1884, No. 11,293.

*To all whom it may concern:*

Be it known that I, LOUIS STERNE, a citizen of the United States of America, and a resident of London, county of Middlesex, England, have invented certain Improvements in Springs, (for which I have applied for a British Patent, dated August 15, 1884, No. 11,293,) of which the following is a specification.

My said invention has for its object to combine rubber and a suitable spring metal—such as steel—in an improved manner, and so as to obtain an increased resistance within a given range of compressive movement, as compared with that of some existing springs having the same quantity of rubber. My improved springs are also of moderate cost, and not liable to the rapid wear which in some springs is caused by frictional or chafing action on the rubber.

In a spring made with my improvements the rubber is in the form of a cylindrical, spheroidal, or ellipsoidal block made with or without a hole through its axis, and its middle or equatorial part is encircled by a zone or belt of spring-steel made so that one end overlaps the other more or less. The zone is of such a breadth that each end of the rubber block, when in an uncompressed state, projects from it, and its edges serve as stops to limit the movements of the plates by which the compression is effected.

An essential feature of the device is the application of a spring-steel zone or belt which is discontinuous, so that it can open or expand to accommodate the expanding rubber when compressed, the elastic resistance of the zone or belt controlling and regulating the expansion of the rubber and assisting the return of the rubber when the compression is removed.

My improved spring is very well suited for drawing, buffing, and bearing purposes in railway rolling-stock, as well as for many other applications.

Figure 5:
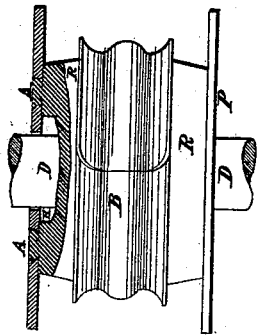
Figure 2:
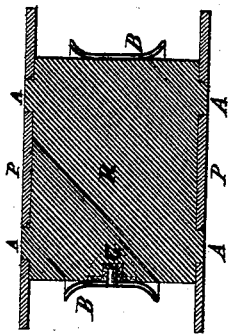
Figure 1:
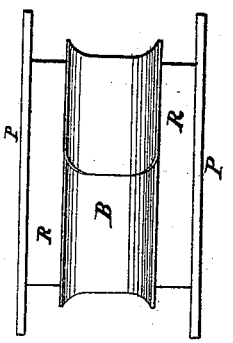
Figure 3:
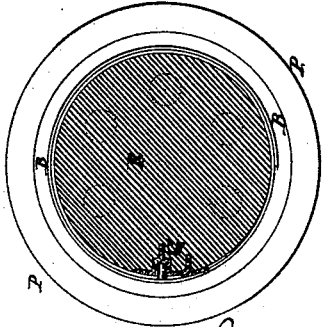

On the accompanying sheet of explanatory drawings one modification of my improved springs is shown in Figures 1, 2, and 3, Fig. 1 being a side elevation, Fig. 2 a vertical section, and Fig. 3 a horizontal section. In this modification the rubber block R is solid and of a cylindrical form, and is placed between plates P, by which compression is applied to it. To prevent the rubber block R from getting out of its proper position between the plates P, it is formed with projections A, which enter holes made for them in the plates. These projections and holes may be dovetailed, as shown in Fig. 5. The middle of the rubber block R is encircled by a zone or belt, B, of spring-steel, which is not a continuous ring, but is made by bending a strip or band of steel so that one end overlaps the other. The edges of the belt B are flared out to prevent the expanding rubber from being cut by them; and in order to prevent the inner end edge of the belt from cutting or chafing the rubber, a small metal guard, G, is placed in a recess formed for it in the side of the rubber block R, and has a pin fixed in it and projecting into a hole in the inner end of the belt B, whereby the belt B is kept with its inner end always at the same part of the rubber block.

Figure 4:
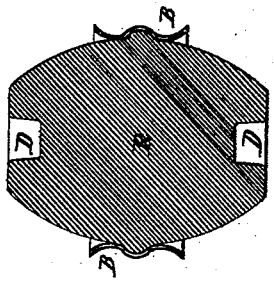

Fig. 4 is a vertical section of a modification in which the rubber block R is solid, but with its sides of an ellipsoidal or curved form, and it is formed with central indents or recesses, D, at its ends for the entrance of projections on the plates between which the spring is compressed, these projections keeping the rubber block in its place.

Figure 6:
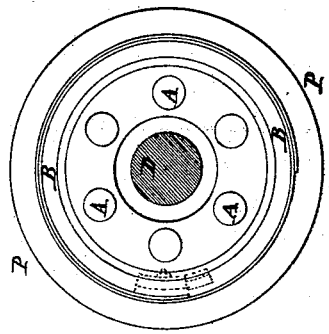

Figs. 5 and 6 are respectively a sectional side elevation and a plan of a modification in which the rubber block R is made with a central hole through it instead of being solid. This modification is suitable for a draw-spring, or for other applications in which it may be necessary or desirable for a rod, D, to pass through the axis of the spring. The central hole, H, through the rubber block R is larger than the rod D, and the rubber block, being kept in position by the dovetailed projections A, is not touched or acted on frictionally by the rod.

Figure 7:
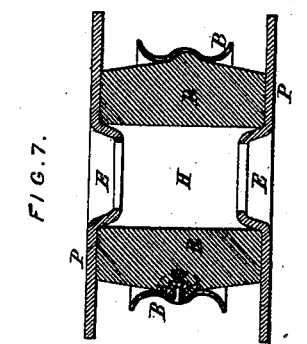

In the modification shown in vertical section in Fig. 7 the plates P are made with projecting sleeves or tubular bosses E, which enter the central hole, H, in the rubber and prevent frictional action between the rod and the rubber.

Figures 8, 9:
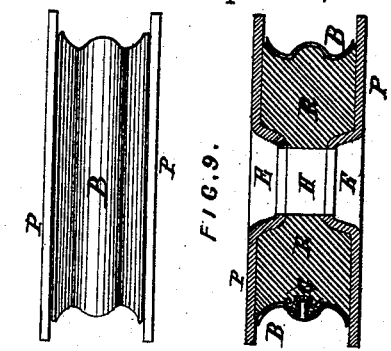

Figs. 8 and 9 are a side elevation and a vertical section showing the spring in its completely compressed state. The breadth of the zone or belt B is proportioned to the uncompressed depth of the rubber block R and to the estimated safe maximum compressibility, so as to act as stops to limit the compressing movements of the plates P.

The middle part of the zone or belt B between the flared edges may be plainly cylindrical, as shown in Figs. 1, 2, and 3; or it may be of any other suitable form. I however prefer to make it of the corrugated form shown in Figs. 5 to 9, the rubber block R being made with an equatorial projecting part shaped to fit the interior of the corrugation of the belt.

What I claim as my invention is—

A spring in which a rubber block to be acted on compressively has applied to it a discontinuous zone or belt of spring metal, substantially in the manner hereinbefore described.

In testimony whereof I have signed my name to this specification in the presence of two subscribing witnesses.

L. STERNE.

Witnesses:
CHAS. ROCHE,
GEO. W. VOLLETT.